United States Patent [19]

Ostler et al.

[11] Patent Number: 5,787,299
[45] Date of Patent: Jul. 28, 1998

[54] PIN SELECTION SYSTEM FOR MICROCONTROLLER HAVING MULTIPLEXER SELECTS BETWEEN ADDRESS/DATA SIGNALS AND SPECIAL SIGNALS PRODUCED BY SPECIAL FUNCTION DEVICE

[75] Inventors: Farrell L. Ostler, Albuquerque, N. Mex.; Ata R. Khan, Sunnyvale; Gregory K. Goodhue, San Jose, both of Calif.

[73] Assignee: Philips Electronics North American Corporation, New York, N.Y.

[21] Appl. No.: 751,281

[22] Filed: Nov. 18, 1996

Related U.S. Application Data

[63] Continuation of Ser. No. 308,057, Sep. 16, 1994, abandoned.

[51] Int. Cl.[6] .................................................. G06F 1/04
[52] U.S. Cl. .................................................. 395/800; 326/37
[58] Field of Search ........................ 395/821, 800, 395/500, 822, 823, 824, 827, 830; 326/37, 38, 41

[56] References Cited

U.S. PATENT DOCUMENTS

| | | | |
|---|---|---|---|
| 4,349,870 | 9/1982 | Shaw et al. | 395/800 |
| 5,047,922 | 9/1991 | Borkar | 395/822 |
| 5,200,696 | 4/1993 | Menis et al. | 324/158.1 |
| 5,260,948 | 11/1993 | Simpson et al. | 371/22.3 |
| 5,335,540 | 8/1994 | Bowler et al. | 73/146.5 |
| 5,402,014 | 3/1995 | Ziklik et al. | 326/37 |
| 5,454,114 | 9/1995 | Yuch et al. | 395/750 |
| 5,475,830 | 12/1995 | Chen et al. | 395/500 |

OTHER PUBLICATIONS

M6800 Microprocessor Application Manual, Motorola Semiconductor Products Inc., 1975, pp. 3–8 to 3–20.

*Primary Examiner*—Moustafa M. Meky
*Attorney, Agent, or Firm*—Debra K. Stephens

[57] ABSTRACT

A microcontroller with selectable function external pins. Program controllable configuration registers control pin function selection through multiplexers which select between data/address lines and special function unit output lines and which control line drivers which are disabled when the pins are used as input pins.

7 Claims, 3 Drawing Sheets

5,787,299

PIN SELECTION SYSTEM FOR MICROCONTROLLER HAVING MULTIPLEXER SELECTS BETWEEN ADDRESS/DATA SIGNALS AND SPECIAL SIGNALS PRODUCED BY SPECIAL FUNCTION DEVICE

This is a file wrapper continuation of application Ser. No. 08/308,057, filed Sep. 16, 1994, now abandoned.

BACKGROUND OF THE INVENTION

1. Field of the Invention

The present invention is directed to a microcontroller with I/O pins for which the function of the pins can be programmably selected and, more particularly, to a microcontroller which includes a pin selection system allowing pins to be used for address/data and special I/O signals.

2. Description of the Related Art

Microcontrollers are currently being called upon to perform many different functions and are being designed with on-chip circuits for special functions, to function as, for example a Universal Asynchronous Receiver Transmitter (UART) or a parallel port. Because the on-chip function circuits need access to devices outside the microcontroller chip, such as for transmit and receive signals of UART, the more recent microcontroller chips need a large number of output pins or must share pins between special functions, which precludes simultaneous use of some combinations of special functions. Because the microcontrollers are being called upon to perform more complex functions, programs executed by the microcontroller are growing in size and complexity. Since only a limited amount of data and instruction memory can be provided on a chip, the microcontrollers are being designed to work with large external memory space, on the order of sixteen megabytes. To address such a large external memory space requires a large number of address pins for accessing the external space (24 pins for 16 megabytes). The word size of the data accessed by the microcontroller has also grown as the complexity of the functions have grown, requiring even more external chip pins. To economize on the use of the external pins, data pins and some of the address pins are shared via time division multiplexing, which solves one of the pin number requirements. However, the need for external access by the special function devices is not solved by this approach. In some circumstances, a microcontroller with a large address space is dedicated to a task that only requires part of the external address space. In this situation, some or all of the multiplexed address and data pins are wasted.

What is needed is a microcontroller that allows external access pins normally being used for addresses to be used for alternate functions, such as for the signals of the special function circuits.

SUMMARY OF THE INVENTION

It is an object of the present invention to allow unused pins to be used for other functions.

It is another object of the present invention to allow a microcontroller to be configured to use on chip special function circuits.

It is also an object of the present invention to reduce the number of pins needed for a microcontroller chip having special function circuits.

The above objects can be attained by a microcontroller that allows selection of the use or function of input/output pins of the chip. The selection is under program control and is performed by an input/output pin function selection circuit coupled between a bus interface unit and the chip pins.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
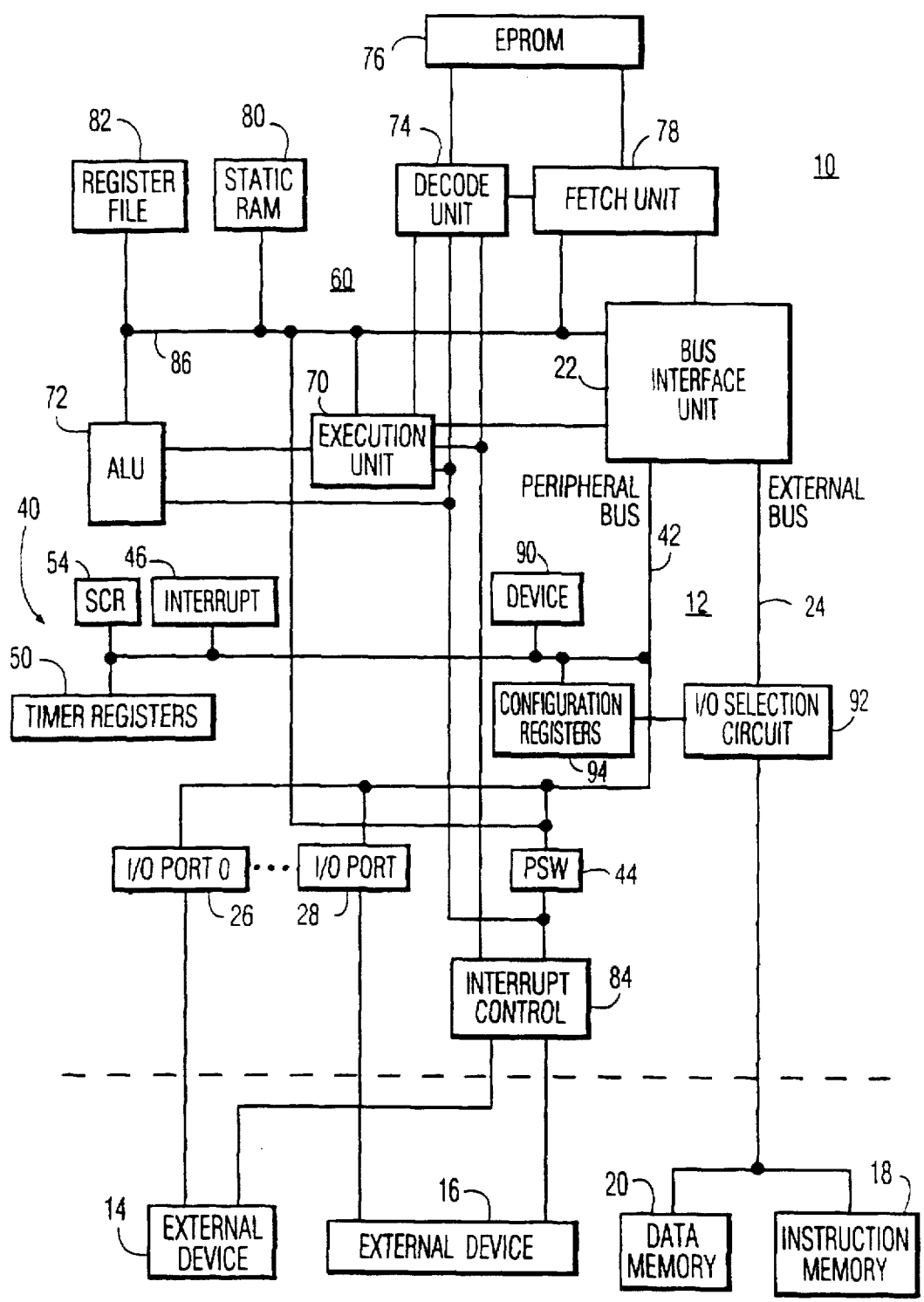
FIG. 1 depicts the architecture of a microcontroller according to the present invention.

The architecture of the microcontroller system 10 of the present invention is illustrated in FIG. 1. This system 10 includes a single chip microcontroller 12 that performs microcode program operations and includes internal instruction and data storage. The microcontroller 12 supports external devices 14 and 16 and, through 24 bit external address capability, supports sixteen megabytes of external instruction memory 18 and sixteen megabytes of external data memory 20. The microcontroller 12 includes a bus interface unit 22 which communicates with the external memories 18 and 20 over an external bi-directional address and data bus 24 where the data and instructions are conventionally time division multiplexed. The microcontroller 12 communicates with the external devices 14 and 16 through I/O ports 26–28 which are addressable as special function registers (SFR) 40. The ports 26–28 as well as other special function registers are addressable over an internal peripheral bus 42 through the bus interface unit 22. The data memory 20 can also be accessed as off-chip memory mapped I/O through the I/O ports 26–28. The on-chip special function registers 40, some of which are bit addressable, also include a program status word (PSW) register 44 coupled to an interruption control unit 84 communicating with the external devices, microcode programmable ALU 72, the execution unit 70 and decode unit 74 for flag and general control, an interrupt register 46; timer registers 50; and a system configuration register (SCR) 54. The program status word register 44 is addressable over the peripheral bus 42 for general register operations and is also addressable over a connection to the internal bus 86 for other execution related operations. The bus interface unit 22 isolates the peripheral special function registers 40 from the microcontroller core 60. The core 60 includes the microcode programmable execution unit 70 which controls execution of instructions by an ALU 72 and the other units. The instructions decoded by the decode unit 74 are fetched from an internal EPROM 76, which is part of an instruction memory space, or from the external instruction memory 18 by a fetch unit 78. Static RAM 80, which is part of data memory space, as well as general purpose registers of a register file 82 are also available for instruction and data storage.

The special function register space 40 also includes one or more special function devices 90, such as the UART or one or more of the ports 26–28 previously mentioned, that particularly require access external to the microcontroller chip 12 and which are accessible by the core 60 over the peripheral bus 42. The external access is provided through the I/O lines of the external bus 24 by an input/output selection circuit 92. Input/output configuration registers 94 are used to specify which lines and, thus, which external chip pins are dedicated to which function. The configuration registers 94 are also special function registers and are accessible by the core 60 over the peripheral bus and can therefore be program controlled.

Figure 2:
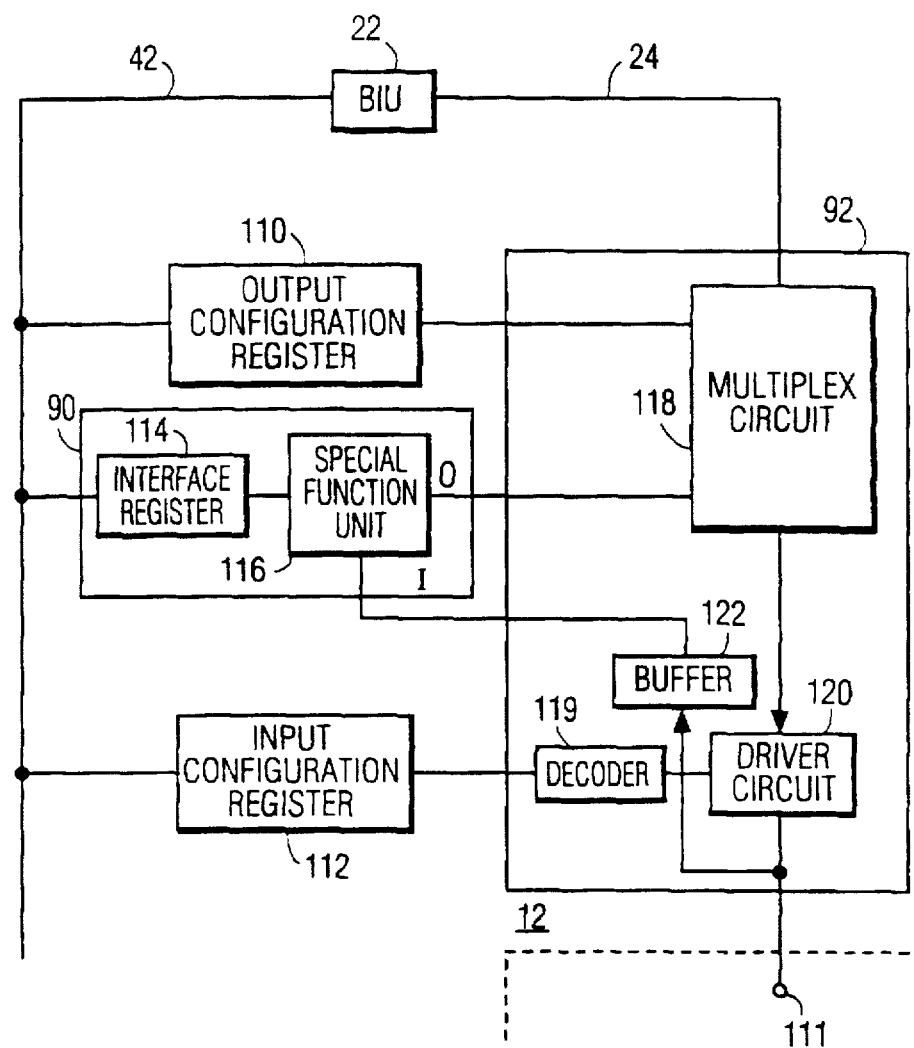
FIG. 2 depicts a pin function selection mechanism of present invention in greater detail.

The configuration registers 94 include both an output configuration register 110 controlling selection of pins 111 for use as output pins and an input configuration register 112 controlling selection of pins for use as input pins, as illustrated in FIG. 2. Each special function device 90 includes one or more interface registers 114 through which the special function device 90 is controlled and through which any input/output data is transferred. The device 90 also includes the actual special function unit 116 which performs the special function, such as the serial transmission and reception of data in a UART. The unit 116 includes one or more output (O) signal lines connected to the selection circuit 92 over which output data (such as the transmit data of a UART) is transmitted and one or more input lines (I) over which input data (such as the receive data of a UART) is received. The selection circuit 92 selects which lines/pins 111 are used as output pins using a multiplex circuit 118 connected to the special function unit 116. The multiplex circuit 118 is responsive to the contents of the output configuration register 110. The selection of which pins 111 or lines are used as input lines is performed by a decoder 119 and a driver circuit 120 which only drives the pins 111 with output signals whenever the contents of the input configuration register 112 indicates that the pins 111 are not used as output pins. That is, the input configuration register 112, through decoder 119, disables the output drivers of driver circuit 120 allowing the pins 111 to be used as input pins. The input signals from pins 111 are distributed to all the various special function devices in the special function unit 90 of the chip 12 by an input signal buffer 122, even though a connection to only one device by buffer 122 is shown.

Figure 3:
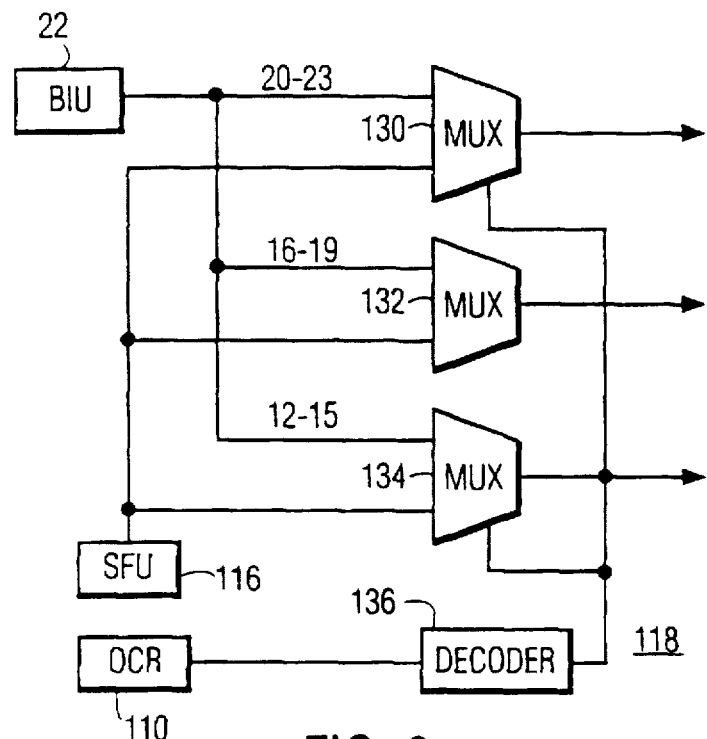
FIG. 3 depicts the details of a mutliplex circuit for the invention.

The multiplex circuit 118, as illustrated in FIG. 3, includes plural multibit multiplexers 130, 132 and 134 which select between the address and output data of the bus interface unit 22 and the special function unit 116 responsive to a selection signal provided by a decoder 136. As illustrated, the multiplexers 130, 132 and 134 each receive different ones of bits from the bus interface unit 22, for example, with multiplexer 130 receiving bits 20–23 (the most significant bits). The multiplexers 130, 132 and 134 can be multibit multiplexers multiplexing even more bits, such as 8 or 16, or the multiplexers can be single bit devices. The decoder 136 conventionally converts the output pin configuration specified in the output configuration register 110 into appropriate selection signals. The configuration of FIG. 3 illustrates a system allowing the most significant eight bits of a 24 bit external bus to be selected for an alternate function. Of course, circuits for all the external address/data pins can be provided so that all the pins can be used for alternate functions.

Figure 4:
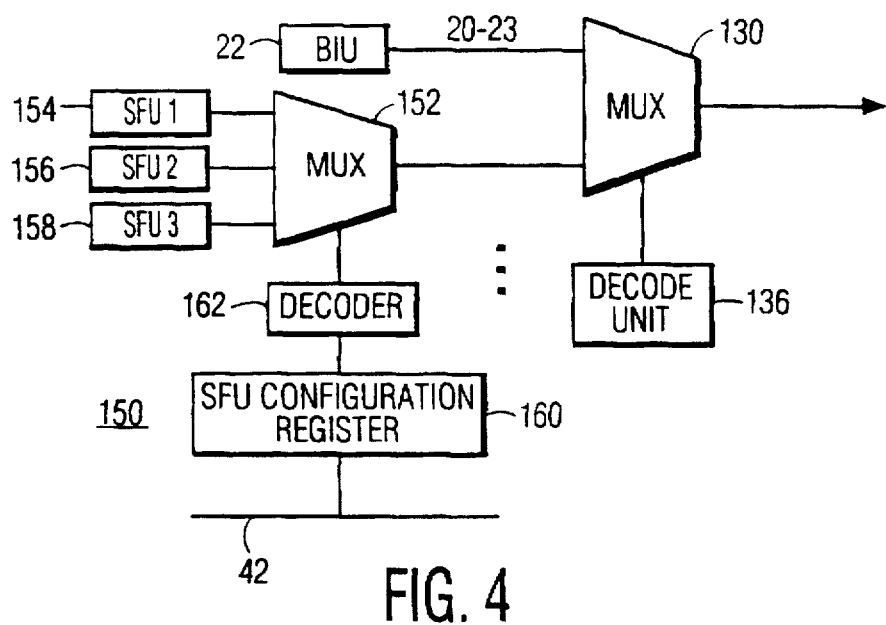
FIG. 4 depicts an alternate multiplex circuit.

When the chip 12 includes numerous special function devices, a hierarchical multiplex circuit 150, as illustrated in FIG. 4, can be used. In this circuit, a multiplexer 152 is used to select between output signals of several special function units 154, 156 and 158, based on contents of a special function unit configuration register 160 as decoded by decoder 162. Several of the multiplexer groups 150 can be provided feeding the multiplexers 130, 132 and 134 (FIG. 3) allowing selection of the output of a large number of special function units.

As previously noted, the configuration of pins as address or alternate function pins is program controlled.

This allows the function of the pins to be dynamically changed during a task. For example, when all the pins are configured for alternate function capability, one or more pins can be used to enable/disable various devices, including external memory, allowing the microcontroller 12 to flexibly perform a large number of functions without requiring additional external pins.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A pin function selection circuit for a microcontroller, comprising:
    a configuration register having contents, said configuration register comprising an output configuration register and an input configuration register indicating a function of external pins of the microcontroller; and
    a function selection circuit connected to the configuration register, to the external pins and to microcontroller units using different input/output function signals, said function selection circuit comprising:
        a multiplex circuit connected to said output configuration register and the microcontroller units; and
        a driver circuit connected to said input configuration register, said multiplex circuit, said microcontroller units and the external pins,
    said multiplex circuit comprising:
        bit multiplexers connected to the microcontroller units and the driver circuit; and
        a decode unit connected to the output configuration register and the bit multiplexers.

2. A pin function selection circuit as recited in claim 1, wherein a configuration of the external pins is program controlled.

3. An external pin selection system for external pins of a single chip microcontroller, comprising:
    a bus interface unit providing address/data signals over an external bus;
    an output configuration register having contents programmable by the microcontroller;
    an input configuration register having contents programmable by the microcontroller;
    a special function device controllable by the microcontroller producing special function output signals and receiving special function input signals;
    an output decode unit connected to said output configuration register and producing an output selection signal responsive to contents of said output configuration register;
    a multiplexer connected to said output decode unit, said bus interface unit and said special function device, and selecting between the address/data signals and the special function output signals responsive to the output selection signal;

an input decode unit connected to said input configuration register and producing an input selection signal responsive to the contents of said input configuration register;

a line driver circuit connected to said input decode unit, the external pins and said multiplexer, and providing signals from said multiplexer responsive to the input selection signal; and a data buffer connected between the external pins and said special function device and buffering the special function input signals.

4. An external pin selection system as recited in claim 3, wherein a configuration of said external pins is program controlled.

5. A pin function selection circuit as recited in claim 4, wherein said external bus has a programmable address bus width.

6. An external pin selection system as recited in claim 3, wherein said external bus has a programmable address bus width.

7. An external pin selection system for external pins of a single chip microcontroller, comprising:

a bus interface unit providing address/data signals over an external bus, said external bus having a programmable address bus width;

a configuration register having contents programmable by the microcontroller;

a special function device controllable by the microcontroller producing special function output signals and receiving special function input signals;

a decode unit connected to said configuration register and producing an output selection signal and an input selection signal in response to contents of said configuration register;

a multiplexer connected to said decode unit, said bus interface unit and said special function device, and selecting between the address/data signals and the special function output signals responsive to the output selection signal;

a line driver circuit connected to said input decode unit, the external pins and said multiplexer, and providing signals from said multiplexer responsive to the input selection signal; and a data buffer connected between the external pins and said special function device and buffering the special function input signals.

* * * * *